United States Patent [19]
Bernheiser

[11] Patent Number: 5,515,116
[45] Date of Patent: May 7, 1996

[54] REMOVABLE EYEGLASS NOSEBRIDGE

[75] Inventor: Charles A. Bernheiser, Enumclaw, Wash.

[73] Assignee: Gargoyles, Inc., Kent, Wash.

[21] Appl. No.: 216,528

[22] Filed: Mar. 22, 1994

[51] Int. Cl.⁶ ......................................... G02C 5/02
[52] U.S. Cl. .......................... 351/124; 351/130; 351/133
[58] Field of Search ........................ 351/47, 58, 86, 351/90, 91, 92, 94, 96, 103, 105, 106, 110, 124, 125, 126, 178, 1340, 133; 2/13

[56] References Cited

U.S. PATENT DOCUMENTS

| | | | |
|---|---|---|---|
| 2,099,748 | 11/1937 | Mertens | 88/47 |
| 2,444,498 | 7/1948 | Cochran | 88/41 |
| 2,519,852 | 8/1950 | Ring | 88/41 |
| 3,233,250 | 2/1966 | Jonassen | 2/14 |
| 3,709,587 | 1/1973 | Wick | 351/106 |
| 4,176,921 | 12/1979 | Matthias | 351/106 |
| 4,515,448 | 5/1985 | Tackles | 351/41 |
| 4,824,233 | 4/1989 | Jannard | 351/47 |
| 4,834,523 | 5/1989 | Porsche | 351/57 |
| 4,951,322 | 8/1990 | Lin | 2/439 |
| 5,293,185 | 3/1994 | Berger et al. | 351/95 |
| 5,345,616 | 9/1994 | Wiedner | 351/136 |
| 5,467,148 | 11/1995 | Conway | 351/124 X |

FOREIGN PATENT DOCUMENTS 3428760 2/1985 Germany ........................ 351/124

Primary Examiner—William L. Sikes
Assistant Examiner—Huy Mai
Attorney, Agent, or Firm—Patrick M. Dwyer

[57] ABSTRACT

An interchangeable eyeglass lens system for sunglasses and other eyewear so that more than one pair of lenses can be used with a particular frame. Lenses particularly adapted for interchangeability and having concavities on the lens periphery for engaging fastener devices, such as studs and spring loaded detents on the frame, are included in the system. A complete system would have a pair of removable lenses, a frame having a nosebridge which can be removable also, and fasteners mounted on or within the frame or nosebridge for releasably holding the lenses in place on the frame by interengaging the concavities on the lenses. A removable nosebridge with antirotational device, and a spring loaded detent system adapted for use in the system are disclosed, as is a method of removably attaching a lens to the frame of the invention.

4 Claims, 6 Drawing Sheets

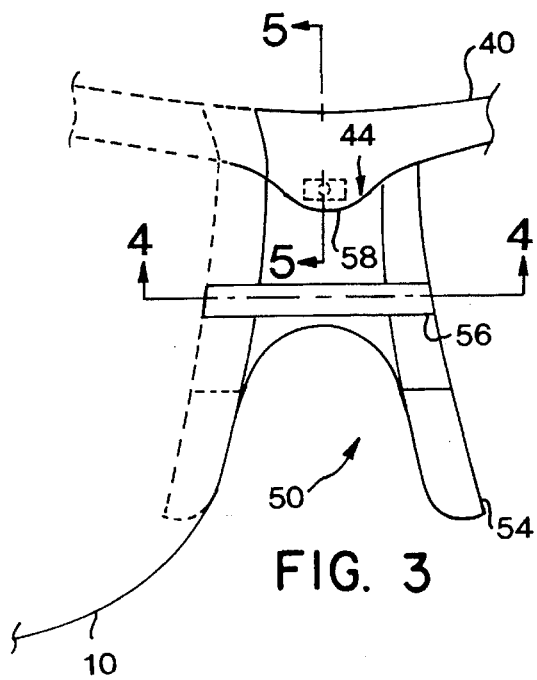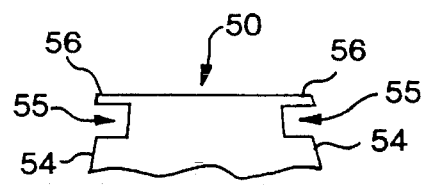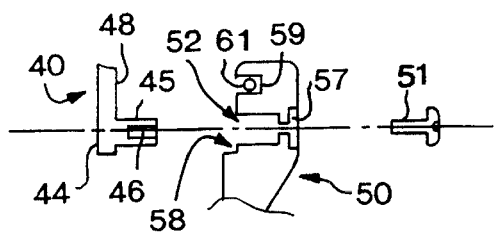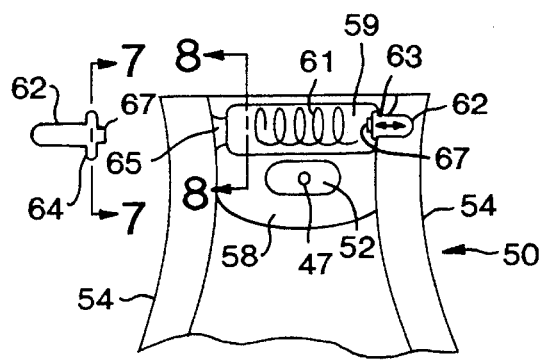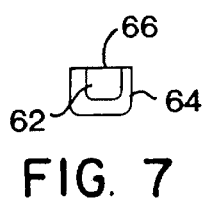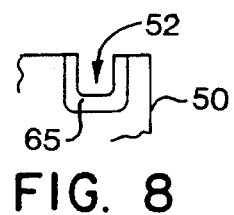

REMOVABLE EYEGLASS NOSEBRIDGE

TECHNICAL FIELD

The invention relates to spectacles and other eyewear such as sunglasses; more particularly, it relates to a system for interchangeable lenses on an eyeglass or sunglass frame.

BACKGROUND

Many people need some sort of corrective lens or magnifier in order to read or see objects at a distance, and so wear eyeglasses. Many such people also wear sunglasses outside in the sun and a practical problem arises if they want to read a book, or otherwise need their eyeglass aided vision. For example, he or she must purchase a pair of prescription sunglasses or endure the sun without the benefit of sunglasses while reading. The purchase of a pair of prescription sunglasses is expensive, but a large part of the expense is due to the cost of the frame. Broken lenses and new prescriptions for the old frames are always much less expensive to replace than the original cost of the frame and lenses combined. Such people have the further practical problem of carrying around at least two pairs of prescription lens and frame sets (i.e., the prescription sunglasses and the reading or distance eyeglasses).

Even for those sunglass wearers whose vision does not require assistance, sunglass lenses break or get scratched, or different activities suggest or require different shapes and/or colors of lenses. For instance, in bright sunlight, a darker shade may be indicated, while in overcast light, a yellow or rose tint can brighten the view; bicycle athletes want a lens with substantial wrap depth to protect their eyes and to improve aerodynamics, but for running or apres-cycle they may want a different shape or color. Sometimes the dictates of fashion simply require a different color or shape lens set.

One approach to deal with this problem has been to use a pair of prescription eyeglasses that are tinted in such a way that there is a minor tint when the ambient light is relatively low and a more severe tint as the ambient light becomes brighter. However, such eyeglasses are relatively expensive and the tint of the lenses may change at times when it is not desirable for it to change.

Another attempt to solve the problem of the need for multiple pairs of corrective or sunglass eyewear is to use "clip-on" or "snap-in" tinted lenses in connection with a pair of clear prescription spectacles. Clip-on lenses are attached to a pair of eyeglasses by a clip, typically located at the center of the clip-on lenses. The clip attaches over the nosepiece of the eyeglasses. Sometimes the clip snaps over the sides of each of a pair of separate lenses formed to the shape of specific eyeglasses for which they are provided. In another variation, a tinted lens is snapped into a circumferential groove inboard of the clear lens. In another attempt to solve the problem, clear prescription lenses are hung, hinged or otherwise detachably mounted inboard of a pair of conventional sunglass lenses. Typically, some additional structure is added to the sunglass frames for holding a prescription lens or pair of lenses behind the sunglass lenses; however in one species, the frames themselves are modified with threads to receive a "screwed-in" prescription lens for each lens of the sunglasses. Clip-on lenses can be disadvantageous, however, because they result in less than desirable optics, typically through an inability to control the spacing and angular relationship between the sunglass lens and its clear lens with any precision or degree of stability, and because they are cosmetically unattractive.

Ultimately, the route everyone seems to take, if they can afford it, is to simply own more than one pair of eyewear, and to carry for a given day or activity the pairs they think they will need. Of course, each pair has its own frameset, and typically its own case, the combined bulk and weight of which will generally discourage all but fanatics from having ready to hand the right eyewear for the right activity or light condition, or simply for the right fashion statement at the moment. All of which is to say nothing of the disastrous expense of having broken a sunglass lens or lenses, or otherwise marred them to the point of needing replacement. Sunglass manufacturers, unlike prescription eyeglass purveyors, do not generally provide ready means for lens replacement; generally, damage to a pair of expensive sunglasses means another trip to the store to buy a new pair, frames and all.

There is therefore a need for a simple, relatively inexpensive lens replacement system for a given frame set that may be employed to support a pair of fashion or performance sunglass lenses, and various colors and shapes of them, and also to support a corrective pair of lenses or a pair of prescription sunglass lenses, that can be used comfortably and effectively for sustained periods of time, and that will provide for interchangeability or quick and cost effective replacement of the various lens types on a single frame set.

SUMMARY OF THE INVENTION

Accordingly, it is an object of the invention to provide a simple, relatively inexpensive lens replacement system for a given frame set that may be employed to support a pair of fashion or performance sunglass lenses, and various colors and shapes of them, and/or to support various corrective pairs of lenses or a pair of prescription sunglass lenses, and that can be used comfortably and effectively for sustained periods of time.

It is a further object of the invention to provide an eyeglass lens system that will provide for interchangeability or quick and cost effective replacement of various lens types and colors on a single frame set.

It is another object of the invention to provide an interchangeable lens for such a system.

It is yet another object of the invention to provide a unique spring loaded detent mechanism adapted for use in such a replaceable lens system.

It is further object of the invention to meet any or all of the needs summarized above.

These and such other objects of the invention as will become evident from the disclosure below are met by the invention disclosed herein.

The invention addresses the above needs and provides such a system. The invention is an interchangeable eyeglass lens system for sunglasses and other eyewear so that more than one pair of lenses can be used with a particular frame. Lenses particularly adapted for interchangeability and having concavities on the lens periphery for engaging fastener devices, such as studs and spring loaded detents on the frame, are included in the system. A complete system would have a pair of removable lenses, a frame having a nosebridge which can be removable also, and fasteners mounted on or within the frame or nosebridge for releasably holding the lenses in place on the frame by interengaging the concavities on the lenses. A removable nosebridge with antirotational device, and a spring loaded detent mechanism adapted for use in the system are optionally also part of the system as is a method of removably attaching a lens to the system's frame.

It is expected that users of the system will be able to carry one or more sets of different lens pairs in a pouch or wallet arrangement or in a purse or belt pack or the like, in addition to a fully assembled frame and lens set either being worn or carried in its case. With the different lens sets carried safely in a soft pouch, space and weight requirements would be much reduced, and an eyeglass wearer could for example conveniently carry and have ready access to dark shaded lenses, light shaded lenses, and clear (magnifying or prescription) lenses, all virtually at the same time and with only a single frameset.

The interchangeable eyeglass lens of the system has two or more concavities, such as notches, nooks, recesses, hollows or indentations, disposed along the lens periphery at some distance to each other, typically along an upper peripheral edge of the lens at substantially opposing ends of upper edge. The general purpose of the concavities is to provide the female part of a male/female releasable attachment system at two or more points along each lens (although in some embodiments, a single screw through an aperture in the lens may suffice). For example, in one embodiment, the two concavities are generally keyhole shaped (or in other words, a substantially circular recess connected to the periphery by a slot that is narrower than the recess). When each keyhole or recess is snapped over the shaft or post portion of a stud or brad each mounted in a corresponding position on the frame, the lens is releasably attached to the frame, until it is snapped back off.

In another embodiment the concavities are semicircular shaped notches in the lens periphery positioned more or less at the upper corners of the lens. Such upper corner positioning is generally preferred so that a simple "brow bar" type of frame can be used, with all lens attachment occurring on the brow bar and the upper edge of the lens. Other attachment locations on differently shaped frame sets will suffice however. In some embodiments it will be advantageous to place a notch at some short distance below an upper corner of the lens, or to have the notch adapted to a certain shape, such as semicircular, or angular, or having ramped surfaces at the intersection of the lens periphery and the notch shape.

A basic version of the interchangeable eyeglass lens system has at least one interchangeable lens, a frame, and at least one and preferably two lens fastener devices (the male portion of the fastener device in particular) mounted on the frame for each lens. A generally preferred fastener is a generally rivet shaped stud having a head portion and a shaft or post portion for releasably engaging a generally correspondingly shaped recess or notch on the lens periphery. The notch is typically substantially circular to suit the preferred cross section of the stud post.

Thus a generally preferred pair of fasteners will be a pair of studs and a pair of notches in the lens periphery located substantially at opposite upper corners of said lens, with the stud positions on the frame corresponding to the notch spacing.

A generally preferred frame is a relatively simple brow bar and nosebridge, with the nosebridge optionally removable. The nosebridge preferably has a pair of lens receiving channels to support the respective inner lens edges. In some embodiments of removable nosebridge, there is one tab in each of the lens channels for releasably interengaging a correspondingly shaped notch in an inner edge of each lens.

In the preferred brow bar and nosebridge type frame, the brow bar has a stud disposed near each hinge end or temple end of the brow bar, and the nosebridge has mounted inside it a spring loaded detent mechanism for releasably interengaging a notch in the upper inner corner of each lens. The preferred lens for use with this spring loaded detent nosebridge has a downwardly sloping nook (forming a kind of "hook" shape at an upper outer corner of the lens) for pivotally and releasably interengaging the outer stud. The downward ("downward" in direction referring, as do all directional indications herein, to the direction with respect to gravity or to center of the face of a lens piece or frame member as it sits when worn by a person) slope of the lower edge of this "hook" defining nook is what allows the lens to be initially positioned to pivotally engage the outer stud prior to threading the inner lens edge into the nosebridge receiving channel, without lens interference with the nosebridge itself during the initial positioning.

The sliding pin detent mechanism has a pair of pins at either end of a spring, with the pins and spring laying in a channel formed in a portion of the nosebridge to form a spring and pin housing. The housing has a pair of collars and each pin has a shoulder with a generally matching shape, so the collars restrain the pins from being pushed out of the channel too far by the spring. The pins have generally smoothly radiused ends opposite the spring to facilitate smooth entry and exit from the corresponding lens notches along the ramped portions of the notch, as will be appreciated by those skilled in the art. Optionally the "pins" can be spherical in shape or substantially so as in conventional detent ball mechanisms.

The complete pin/spring housing is formed in part by a removable nosebridge and in part by the brow bar, and a channel as described above in one or the other, but preferably in the nosebridge. Preferred pins have a generally elongate shape and, while rounded in cross section at sides and bottom to facilitate smooth sliding in the channel and over the collars which have matching cross sections, at least one face is substantially flat to promote smooth sliding engagement with the mating surface of the brow bar at its interface with the nosebridge.

One removable nosebridge embodiment has a pair of flanges for supporting inner edges of a pair of lenses, and a pair of lens stays or tabs for defining in part with the pair of flanges, a pair of lens receiving channels. The nosebridge also has at least one antirotation device so that the nosebridge resists rocking and other shifting motion even when the lenses are removed from the frame. The antirotational device can be a keyway in the nosebridge for receiving a correspondingly shaped key on the brow bar, or it can be a recess in the nosebridge for receiving a correspondingly shaped boss on the brow bar, or both. Alternate antirotational structures may also by applied such as a variation on conventional tongue and groove structure.

The invention also includes a method of interchanging a lens in an eyeglass frame having a nosebridge with the following steps: removably attaching the lens by aligning a downwardly sloping nook at an upper outer corner of the lens with a stud mounted on a brow bar of the frame at an outer end of the frame, so that the inner edge of the lens is below the nosebridge, and sliding the lens under a head on the stud along the nook; pivoting the lens upwardly around the stud/nook engagement and into a lens receiving channel on the nosebridge; continuing to pivot said lens upwardly along the channel until a notch at an upper inner corner of the lens snaps into engagement with a spring loaded detent in the nosebridge; removing the lens by pressing downward firmly and gently at an upper inner corner of the lens to disengage the detent and slide the lens downwardly through the channel until an upper edge of the lens is below the nosebridge; sliding the lens from under the head on the stud along the nook until the lens is free of the stud.

The invention is both method and apparatus for detachable eyeglass lenses, such as for instance in sunglasses, whereby a relatively expensive frame member and nosebridge assembly can be removably fitted with a variety of colors, shades, curvatures, or prescriptions of lenses. Scratched or otherwise damaged or worn out lens can thereby be replaced at relatively low cost, and without having to buy new or different sunglasses.

In one embodiment, lenses are fashioned, such as by molding, to have two indentations on either side of an upper edge of each lens piece. These indentations mate with and preferably snap into two detent means (such as posts or pins) spaced appropriately on the frame. The lenses remain securely mounted on the frame until snapped off. Alternatively, each lens may be removably attached to the frame with a screw passing through an upper centrally located hole in the lens. The lens indentations are in some embodiments specially adapted for snap attachment by shaping the indentation to have a relatively restricted opening, as compared to the size of the indentation required to accommodate the holding pin or post.

In one embodiment, the inner "pin" for each lens is integral to a detachable nosebridge piece, rather than mounted directly on the frame itself, so that one detent is on the brow bar portion of the frame at a relatively outside location, and the other detent is on the nosebridge for the inner location. Preferred embodiments employ a specially adapted spring loaded detent mechanism, though a mechanism like that employed in the watch band type spring pin may be conveniently substituted with some modifications to the pins or the notches, as will appreciated by those skilled in the art. Thus a slidably mounted detent pin on either side of a spring is fitted into a channel in the nosebridge so that lenses may be snapped into place by displacing the sliding pins against the spring tension, which then temporarily lock into place to hold the lenses. Alternatively, the spring loaded detent mechanism could be mounted on or integral to the brow bar itself rather than to the nosebridge.

Preferred embodiments of the removable nosebridge piece will have a recess cooperating with a correspondingly shaped boss on the brow bar to limit or prevent rotation of the nosebridge with respect to the brow bar. Alternatively, or in addition, the brow bar can have a recess cooperatively shaped to receive a correspondingly shaped boss on the nose piece, or the nose piece can have two or more such recesses for receiving corresponding bosses on the brow bar. In preferred embodiments of the removable nosepiece aspect of the invention, nosepieces are also interchangeable for desired fit, color, etc. (for example, being held to the brow bar by a screw), and the nosepiece has a pair of projecting tabs positioned to additionally secure and stabilize the detachable lenses, the tabs being opposed to an inner flared portion of the nose piece against which the lenses rest when in position on the brow bar, so as to form a channel within which the inner edge of the lenses repose.

BRIEF DESCRIPTION OF THE DRAWINGS

FIG. 3 is a partial front view of a preferred brow bar and nosebridge assembly (showing placement and position of partial lens).

FIG. 4 is a partial cross sectional plan view taken along line 4—4 of FIG. 3.

FIG. 5 is a partial cross sectional exploded side elevation taken along line 5—5 of FIG. 3.

FIG. 6 is a partial front elevation, partially exploded, of the nosebridge illustrated in FIG. 3, but without the brow bar or lens in place.

FIG. 7 is a cross sectional view taken along line 7—7 of FIG. 6.

FIG. 8 is a partial cross sectional view taken along line 8—8 of FIG. 6.

BEST MODE OF CARRYING OUT THE INVENTION

Figure 1:
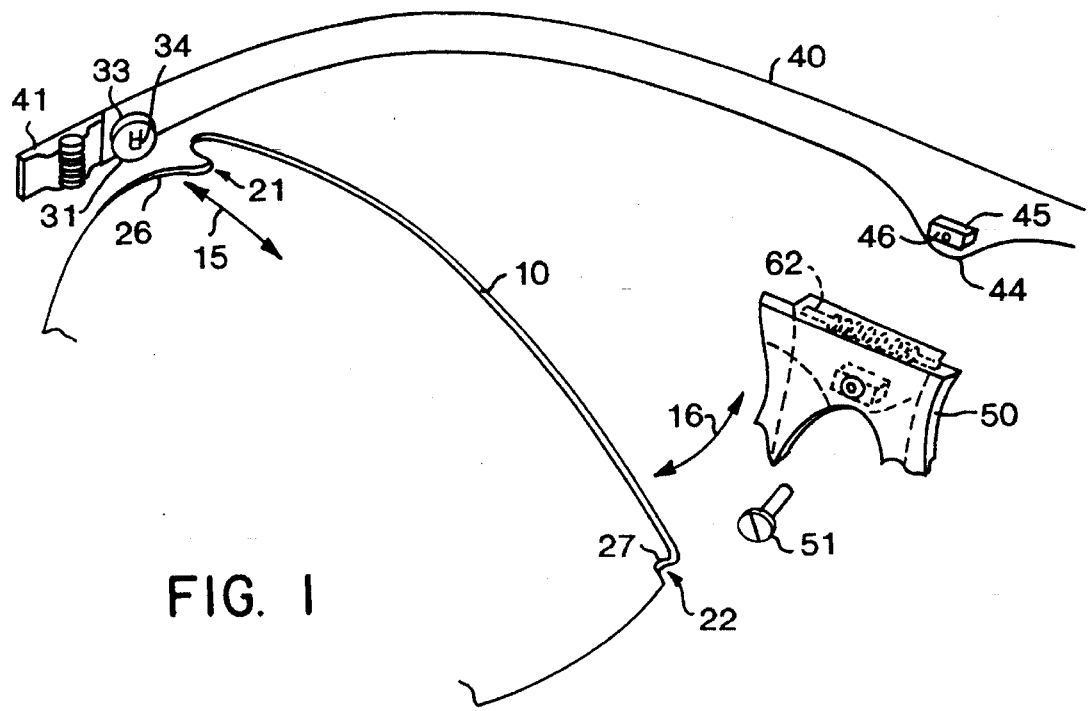
FIG. 1 is an exploded partial perspective rear view of a preferred aspect of the system of the invention.

Preferred sunglasses for use in the present invention are those eyewear having toric lenses and substantial wrap depth such as those described in U.S. Pat. No. 4,741,611 to Burns and U.S. Des. Pat. No. 270,165 to Burns. Other preferred sunglasses have spherical lenses. These sport performance and fashion sunglasses are commercially available under the trademark GARGOYLES. The disclosures of these patents are hereby expressly incorporated by reference. The invention contemplates that any preferred shape or curvature of lens, such as "spherical" will employ a curved brow bar having generally the same curvature, at least at the points along which the lens and brow bar will be in contact. The "brow bar" form of frame set is preferred because it is capable of adaptation to a wider range of lens shapes and curvatures than a more complex frame would be.

Turning now to the drawings, the invention will be described in a preferred embodiment by reference to the numerals of the drawing figures wherein like numbers indicate like parts.

In FIGS. 1, 2, 9, and 11 a generally preferred embodiment is shown. FIG. 1 is an exploded partial perspective rear view of lens 10 (also shown in FIG. 11) aligned for sliding engagement and disengagement along the line indicated by arrow 15 with stud 31 as the first step in attaching, and the last step in detaching, lens 10 to brow bar 40. Nook 21, which will engage the post 34 of stud 35 so that lens 10 is under stud head 33, has downwardly sloping edge 26 so lens 10 does not hang up on, or otherwise interfere with, nosebridge 50 during attachment and detachment of lens 10 to brow bar 40 at stud 31. Stud 31 is shown in a preferred location near hinge 41. Lens 10 also has notch 22 having notch ramp surface 27 to accommodate detent pin 62 (shown as dotted line) in nosebridge 50.

Nosebridge 50 is removably attached to brow bar 40 by screw 51 passing through an aperture in nosebridge 50 and into threaded aperture 46 in key 45. After lens 10 is secured on stud 31 at a stud/nook pivotal attachment point, lens 10 is pivoted upwardly in the direction shown by arrow 16 to attach to brow bar and nosebridge via pin 62, and pivoted downwardly in the reverse direction of arrow 16 to remove the lens.

Figure 9:
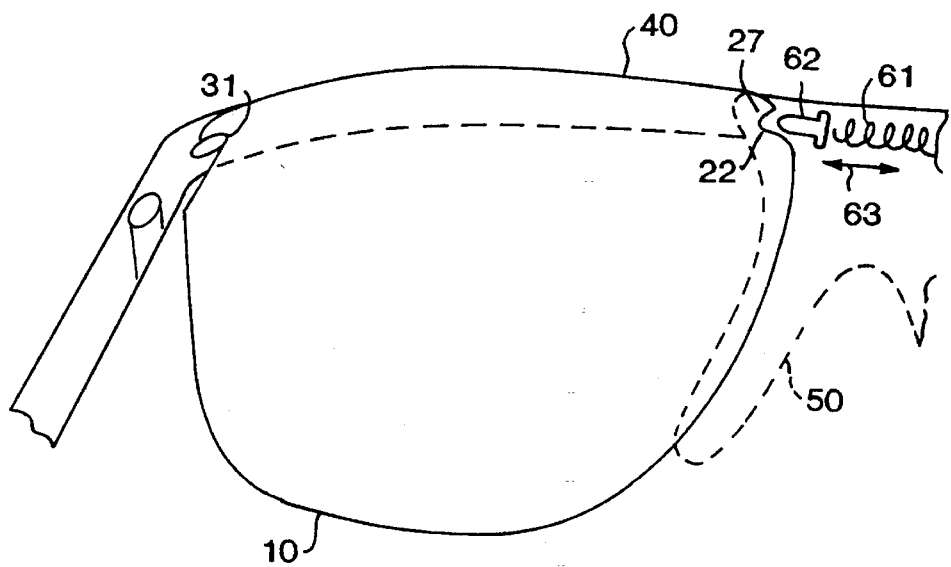
FIG. 9 is a partial rear elevation of the embodiment shown in FIG. 1, after snapping the lens in place, with added schematic detail of detent pin and spring (dotted line illustrates position of nosebridge).
Figure 2:
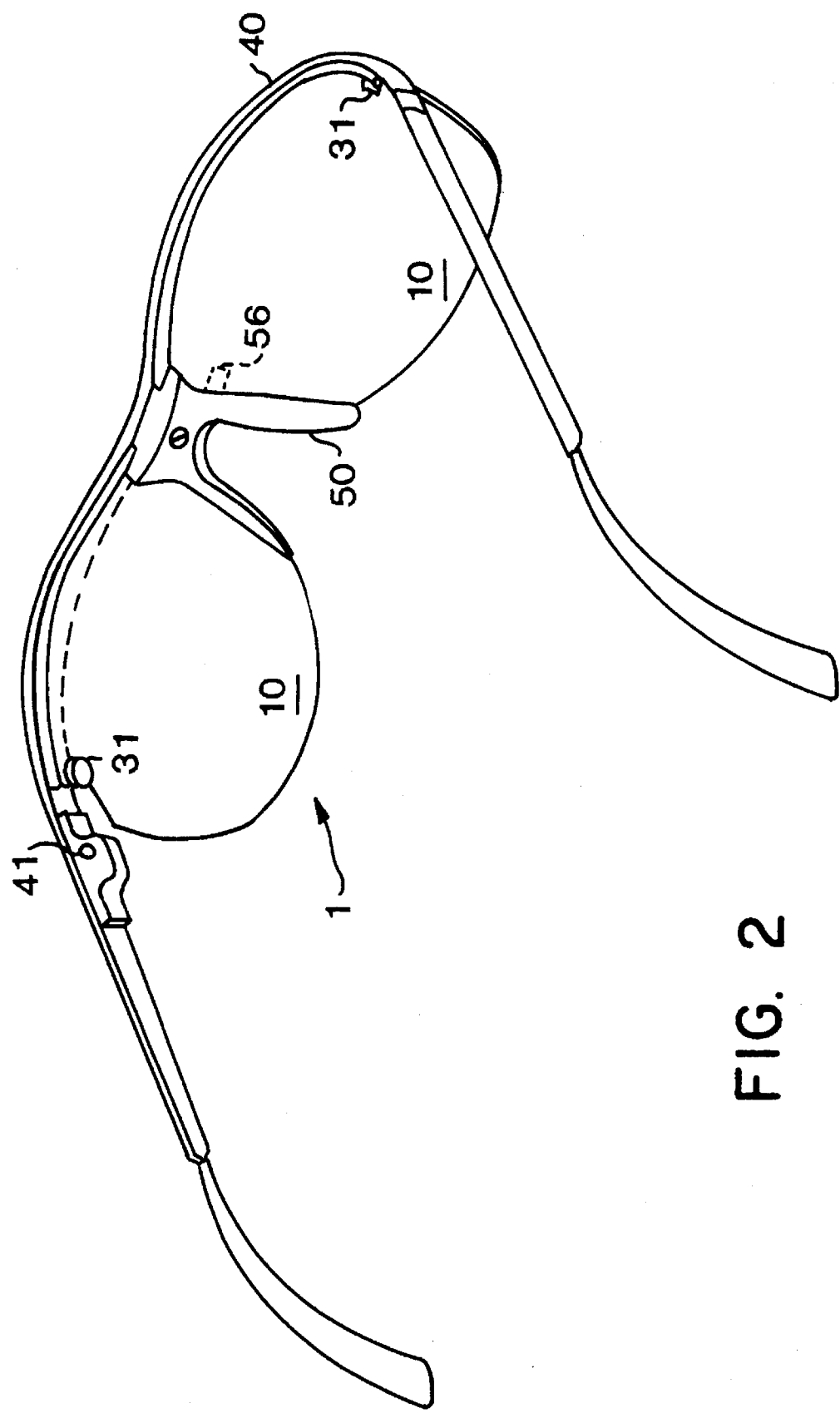
FIG. 2 is an isometric rear view of an assembled lens set and frame of the preferred system.

FIG. 2 is an isometric rear view of an assembled eyeglass lens set and frame 1 of the preferred system partially shown in FIG. 1. Front positioned lens stay bar 56 is partially visible (shown in dotted line) through right lens 10. FIG. 9 is a partial rear elevation of the embodiment shown in FIG. 1, after snapping lens 10 in place, showing schematic placement of detent pin 62 and spring 61. A dotted line illustrates schematically where the nosebridge containing the pins and spring would be if present. Pin 62 is generally free to move, against the resistance of spring 61, in the direction shown by arrow 63 so that notch 22 may alternately be engaged and disengaged with pin 62. Slight direct downward force on lens 10 just above notch 22 causes ramp 27 of notch 22 and pin 62 to cooperate to push pin 62 back against spring 61 in the direction of arrow 63 to release the lens from the pin.

FIGS. 3–8 show details of a preferred nosebridge for use with the embodiment shown in FIG. 1. FIG. 3 is a partial front view of a preferred brow bar 40 and nosebridge 50 assembly (showing placement and position of partial lens 10). Nosebridge 50 has a generally rear flange 54 on either side and front positioned lens stay bar 56 to form therebetween a lens receiving channel 55 (see FIG. 4).

FIG. 5 is a partial cross sectional exploded side elevation taken along line 5—5 of FIG. 3 showing assembly of brow bar 40, nosebridge 50 and screw 51. Screw 51 is preferably countersunk in countersink 57. Key 45 fits snugly into keyway 52 to prevent rotation of the brow bar and nosebridge with respect to one another. In addition, boss 44 fits snugly into hollow 58 to augment the same purpose. Inner bridge face 48 of brow bar 40 encloses channel 59 in nosebridge 50.

FIG. 6 (with FIGS. 7 and 8) is a partial front elevation, partially exploded, of the nosebridge 50 illustrated in FIG. 3, but without the brow bar or lens in place, the better to illustrate the shape of hollow 58 and the working of pin channel 59 and the detent pin/spring mechanism. Channel 59 runs the width of nosebridge 50 between flanges 54 so that spring loaded pins 62 protrude somewhat into the lens channel partially defined by the flanges 54. Pins 62 are restrained from exiting channel 59 by narrowings or collars 65 at or near either end of channel 59. Pins 62 have corresponding shoulders 64 for engaging collars 65 to prevent pin expulsion from the channel and to set optimal pin projection into lens channel 55, as will appreciated by those skilled in the art. To optimize and facilitate pin engagement and release in lens notches 22, pin ends are radiused. Pin bosses 67 engage the ends of spring 61 to inhibit spring loss when brow bar 40 is removed, and for positive engagement of pins with the spring. Front surface of hollow 58 is generally flat for smooth jointure of boss 44 into nosebridge 50, where face 48 serves as cover plate for spring channel 59. The "top" surface 66 of pin 62 (that is the surface of pin 62 touching face 48) is generally flat, to better promote easy and unrestricted sliding of the pin over face 48.

Figure 10:
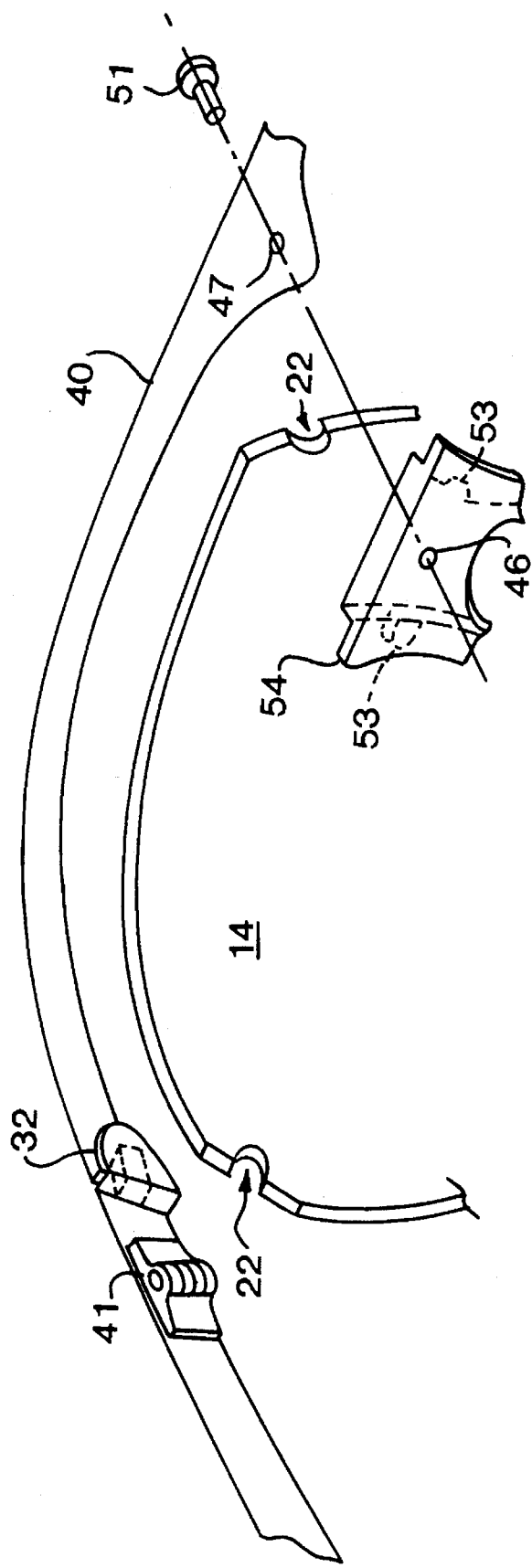
FIG. 10 is an exploded partial rear isometric view of an alternate embodiment of the invention.
Figure 11:
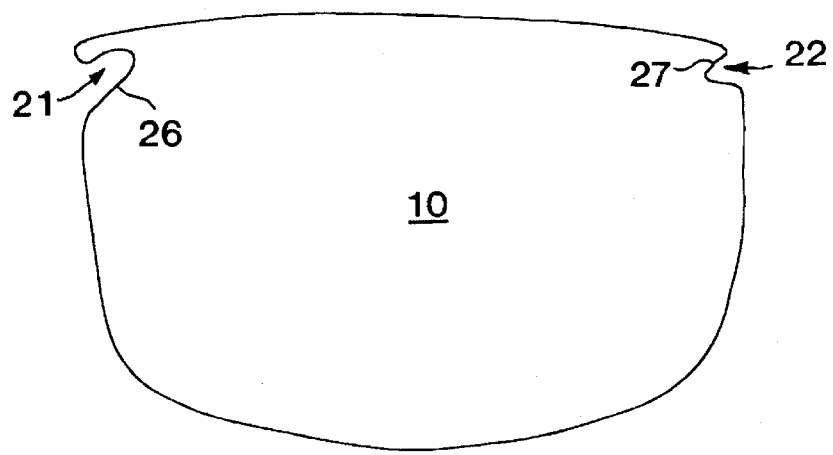
FIGS. 11–13 are rear elevations of various lens embodiments of the invention.

FIG. 10 is an exploded partial rear isometric view of an alternate embodiment of the invention where a pair of generally semicircular notches in lens 14 engage a flanged key 32 at the temple side of the brow bar and a lens tab 53 at the nosebridge. Tab 53 projects from the body of nosebridge 50 onto flange 54 or into channel 55 to engage notch 22 when nosebridge 50 is removably attached to brow bar 40 with screw 51 through aperture 47 in brow bar 40 and into threaded aperture 46 in the nosebridge.

Figure 12:
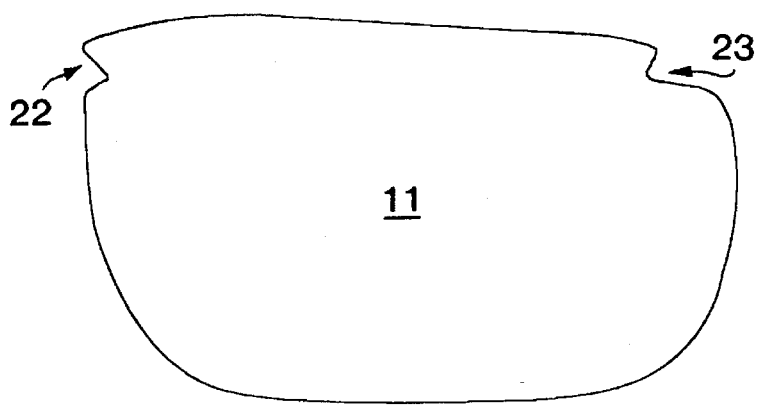
Figure 13:
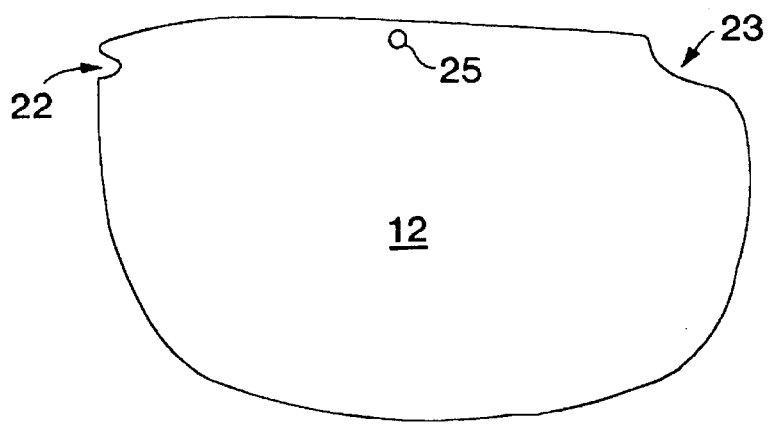

FIGS. 12 and 13 are rear elevations of various other lens embodiments of the invention. Lens 11 has angular shaped notch 22 and indentation 23. Lens 12 has rounded angular notch 22 and smoother indentation 23. Lens 12 optionally has aperture 25 for receiving a screw 35 to hold lens 12 to brow bar 40, instead of or in addition to other concavities on the lens edge (see FIG. 14).

Figure 14:
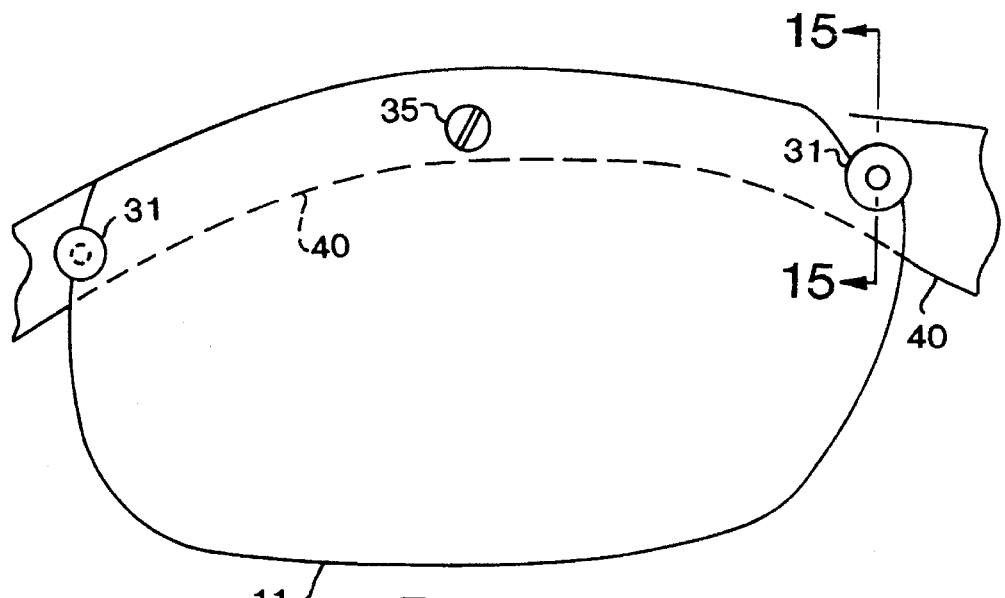
FIG. 14 is a partial rear elevation of an alternate embodiment of the invention.
Figure 16:
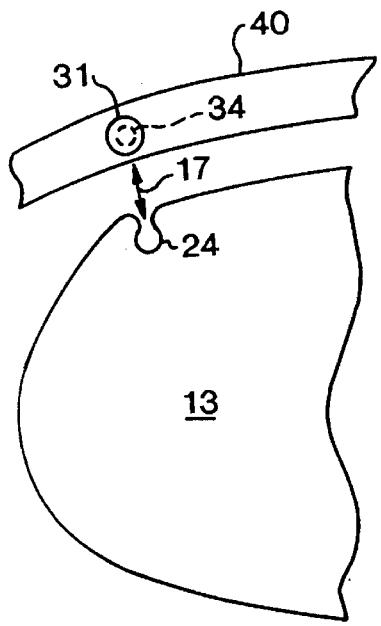
FIG. 16 is a partial rear elevation of an alternate embodiment of the invention.
Figure 15:
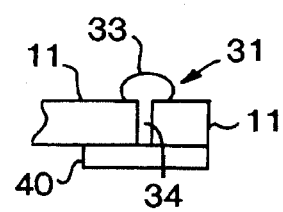
FIG. 15 is a partial cross sectional view taken along line 15—15 of FIG. 14.

FIGS. 14–16 are partial rear elevations of alternate embodiments of the invention. Lens 11 is removably fastened to brow bar 40 by means of studs 31 and notch 22 and indentation 23 (screw 35 is optional and/or alternative). Alternatively, one or both of studs 31 may be slidable (mechanism not shown, but a variant of the pin and spring mechanism above illustrated will serve if installed in brow bar under the stud) to the left and/or right, with or without resistance to some spring tension (such as for example in conventional sliding brief case latches). It is contemplated that a slidable stud would accommodate different concavity spacings on a variety of lenses, in addition to providing an alternate releasable fastener mechanism. FIG. 15 shows details of stud 31 and engagement of lens 11 under stud head 33 and around stud post 34. In FIG. 16 lens 13 has snap fitting optimized recess 24 for releasable engagement with the post 34 of stud 31 along the directions indicated by arrow 17.

In all embodiments disclosed above, with the possible exception of those working with sliding pins or studs, it is anticipated that some flexing or twisting of the lens be employed to "snap" it into place, and that some small torque be applied to "unsnap" it from its attached position.

In preferred embodiments, lenses are comprised of conventional molded hardcoated polycarbonate lens material and have spherical curvature. Brow bar and studs are comprised of a conventional alloy of nickel/silver. Screws are preferably stainless steel. The nosebridge is presently a molded acetate or propionate polymer material, but it is anticipated that a molded NYLON or other polyamide material will be preferred.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A removable eyeglass nosebridge for use in an interchangeable eyeglass system having a brow bar and a pair of removable lenses each having inner edges, the nosebridge comprising a pair of flanges for supporting the inner edges of the pair of lenses and a pair of lens stays for defining in part, with the pair of flanges, a pair of lens receiving channels; and an antirotation device for preventing the nosebridge from rotating with respect to the brow bar.

2. The apparatus of claim 1 wherein the inner edges of said lenses are notched and the nosebridge further comprises a detent mechanism for releasably engaging the notches.

3. The apparatus of claim 1 wherein said antirotation device is comprised of a keyway in the nosebridge for receiving a correspondingly shaped key disposed on the brow bar.

4. The apparatus of claim 1 wherein said antirotation device is comprised of a recess in the nosebridge for receiving a correspondingly shaped boss on the brow bar.

* * * * *